Aug. 18, 1964 D. W. TURRELL 3,145,349

VARIABLE FREQUENCY OSCILLATOR

Filed April 12, 1962

United States Patent Office 3,145,349

Patented Aug. 18, 1964

3,145,349
VARIABLE FREQUENCY OSCILLATOR

Douglas W. Turrell, North Wales, Pa., assignor to Leeds and Northrup Company, Philadelphia, Pa., a corporation of Pennsylvania Filed Apr. 12, 1962, Ser. No. 187,099
6 Claims. (Cl. 332—16)

Figure 1:
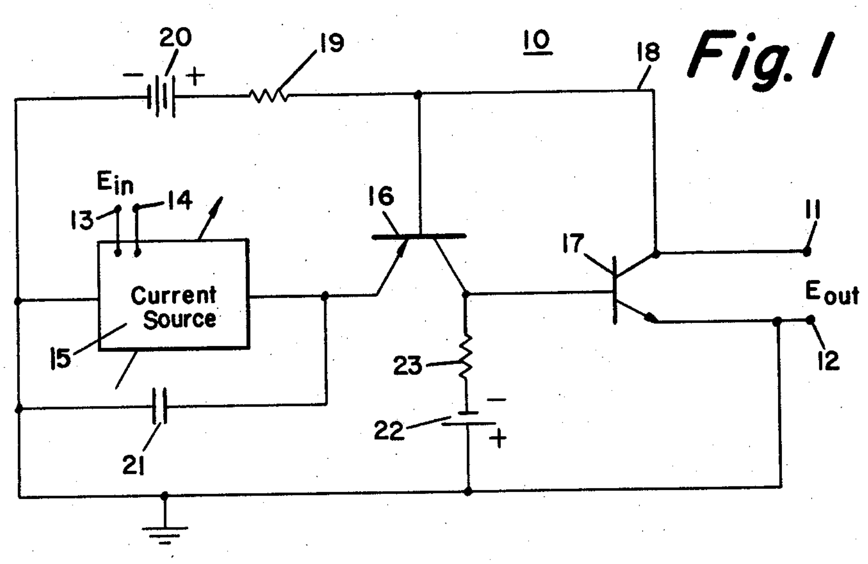

This invention relates to oscillators of the type in which it is desired to produce an output frequency which varies with the magnitude of a direct current input and has for an object the provision of a simple reliable oscillator utilizing a pair of transistors and a reference voltage source.

Though transistor oscillators and those involving their vacuum tube counterparts have long been utilized, much has been left to be desired in attaining by means of a relatively simple circuit long term stability, direct proportionality between applied input and output frequency, and a desired range of frequency for a given range of input.

In carrying out the invention in one form thereof, two transistors of opposite type are utilized with a regenerative feedback connection between the collector of a second of the transistors and the base of the first transistor. The conductivity of the second transistor is controlled by a direct connection to its base from the collector of the first transistor. Biasing circuits normally maintain both transistors non-conductive. By providing an input circuit for the first transistor including in series a variable direct current source of supply, the emitter-base junction of the first transistor, a load resistor and a source of reference voltage providing the bias to maintain the first transistor non-conductive, a capacitor connected across the direct current source of supply will determine the output frequency as a function of the magnitude of the current flowing from said source of supply. More particularly, as the capacitor is charged it changes the potential applied to the emitter-base junction of the first transistor to render it conductive at a time when the potential of that capacitor rises to a value at least equal to that of the reference voltage. Current then flows to the base of the second transistor for rendering it conductive. The regenerative feedback connection greatly hastens the action and produces operation of the transistors in their fully conductive current-saturated states.

In this manner there is provided a discharge circuit for the capacitor through a circuit including only the low internal resistance of the current saturated transistors. As the capacitor rapidly discharges, the current supplied to the base of the second transistor decreases to a point where there is a resultant rise in potential of its collector which because of the feedback connection to the base of the first transistor causes a rise in potential at the base of the first transistor to turn it off. The foregoing action produces an output pulse of substantial amplitude and short duration.

As soon as the capacitor again charges to a value equal to that of the reference voltage the operation is again initiated. From the foregoing it will be seen that the magnitude of the charging current of the capacitor will predominantly determine the frequency of the output pulses and thus the output frequency will be proportional to the magnitude of the input.

For further objects and advantages of the invention and for further features thereof, reference is to be had to the following description taken in conjunction with the accompanying drawings in which:

FIG. 1 schematically illustrates one embodiment of the invention; and

Figure 2:
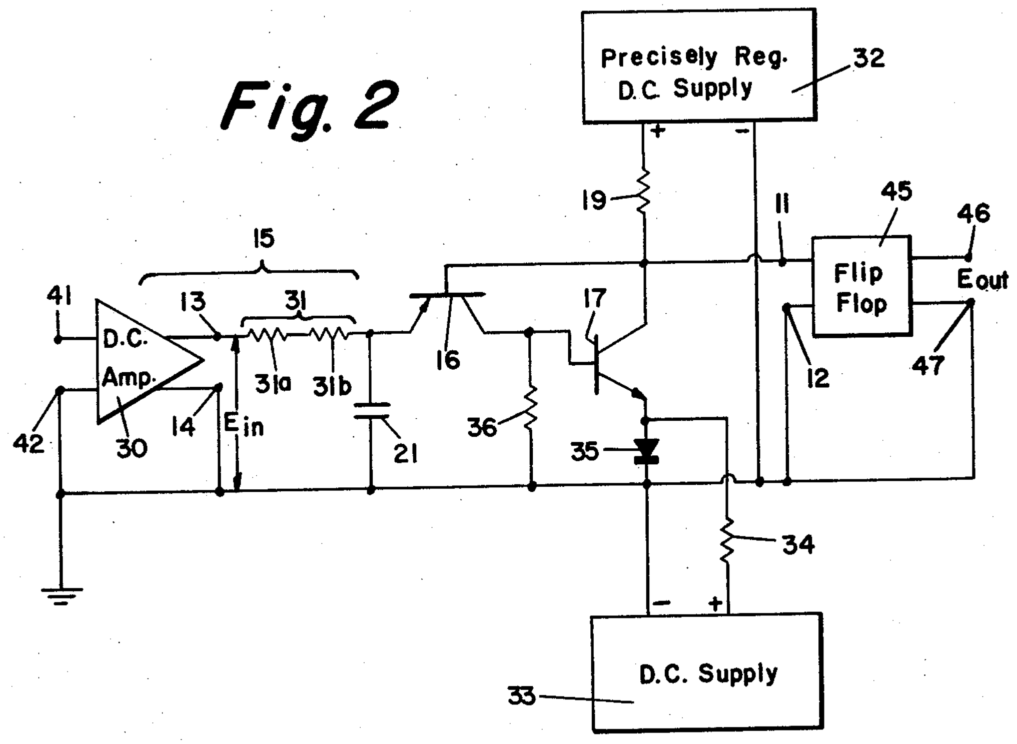

FIG. 2 diagrammatically illustrates another preferred form of the invention.

Referring now to FIG. 1, the invention in one form has been shown as applied to an oscillator 10 having output terminals 11 and 12 from which there is to be derived an output, as in the form of a succession of pulses appearing with a frequency proportional to the magnitude of the input. In FIG. 1 that input has been represented by the voltage $E_{in}$ applied to input terminals 13 and 14 of a variable direct current source 15, the output of which will be a constant current for a constant value of the input voltage $E_{in}$ and proportional to the magnitude thereof. The foregoing is achieved by means of a first transistor 16 and a second transistor 17, the latter having its collector connected by a regenerative feedback connection 18 to the base of the first transistor 16.

The input circuit to the first transistor 16 includes in series the variable current source 15, the emitter-base junction, a load resistor 19, and a source of reference potential 20, shown as a battery and which as will later be explained, may be a regulated source of direct current supply. The polarity of the reference voltage 20 is in a direction to bias transistor 16 to its non-conductive state.

A capacitor 21 is connected across the direct current source 15 and is adapted to be charged thereby. The second transistor 17 is biased to its non-conductive state by a source of biasing potential 22 connected to the base terminal by way of a resistor 23.

In operation, the direct current source 15 having a constant output current proportional to the magnitude of the voltage applied to its input terminals 13 and 14 is effective to charge the capacitor 21. As soon as the potential of capacitor 21 rises to a value at least equal to the reference voltage 20, the emitter-base junction of transistor 16 begins to conduct. This signals the end of the charging cycle and the discharge cycle then occurs with great speed. Current flows from the collector of transistor 16 to the base of transistor 17 to turn on this transistor. By reason of the regenerative feedback connection 18 both transistors are quickly operating in their fully conductive current-saturated states whereby the capacitor discharges through a circuit which includes only the low internal resistances of said current-saturated transistors 16 and 17. The result is the development at output terminal 11 of a negative going voltage pulse for transistors of the conductive type illustrated in FIG. 1. For transistors of opposite type and with reversed input, and reversed reference and bias potentials 15, 20 and 22 respectively, a positive going pulse will be developed.

Since the discharge of capacitor 21 occurs quite rapidly, there is a rapid decrease in the current supply to the base of transistor 17 with a resultant rise in the potential of the collector. Again through the action of the regenerative connection by way of conductor 18, transistor 16 is rendered non-conductive. This initiates a second charging cycle for the capacitor 21. The time required for the capacitor 21 to acquire a charge with a potential developed by the capacitor across the emitter-base junction at least equal to the potential applied thereto by the reference voltage 20 will depend, of course, upon the magnitude of the current flowing to that capacitor. Thus the repetition rate or the frequency at which output pulses are developed at output terminal 11 will depend upon and will be substantially proportional to the magnitude of that current.

The current source 15 may be of any one of many known to those skilled in the art and in which the direct current output will have a magnitude proportional to the magnitude of a direct current voltage input and which will be constant as long as the input is constant. For example, that source may be of the kind shown in U.S. Patent 2,901,563. It may also be of the character to be described in conjunction with the embodiment of FIG. 2.

Those skilled in the art will understand that instead of utilizing a PNP transistor 16 for the first stage and an NPN transistor 17 for the second stage, these transistors may be interchanged with corresponding reversals of polarity of sources 15, 20 and 22.

The voltage at the output terminal 11 from which the negative-going pulses may be taken is fixed by the source 20 which is directly connected between terminals 11 and 12 by way of load resistor 19. Negative-going output pulses may also be taken from across the capacitor 21.

For transistors of opposite type, it will be seen at once that the polarities of terminals 11 and 12 will be reversed, and positive-going pulses will be produced relative to the negative base potential then applied to terminal 11.

In the embodiment of FIG. 2 in which corresponding parts have been given corresponding reference characters, it will be noted that the variable current source 15 comprises the output of a direct current amplifier 30 to which a direct current input is applied at input terminals 41 and 42. The output circuit of the direct current amplifier 30 includes a high-valued resistance means 31 formed by two resistors **31*a* and 31*b*, one of which, for example the resistor 31*a*, may be of fixed value and having a negligible temperature coefficient of resistance while the other, the resistor 31*b*, will be of a material having a suitable positive temperature coefficient of resistance for the purpose of compensating for the rise of leakage currents of transistors 16 and 17 with rise in ambient temperature. The resistance means 31 is high-valued in order to form in conjunction with the output of the direct current amplifier 30 a substantially constant current source for the charging of the capacitor 21 at rates proportional to the magnitude of the voltage applied to the input terminals. That voltage may be taken as that applied to terminal 41 in correspondence with the embodiment of FIG. 1, the voltage appearing at point 13** of FIG. 2.

Those skilled in the art understand that a high resistance in series with a source of voltage effectively provides a current source whose output changes linearly over a given range of change in the applied voltage. Thus where the frequency at the output terminals 11 and 12 is to vary through a range of say 36 to 60 cycles per second, the high resistance in series with the voltage source 30 will be quite satisfactory where the linearity need only be of the order of ± one-tenth of a percent as between the magnitude of the output voltage $E_{in}$ at terminals 13 and 14 and the frequency at terminals 11 and 12.

In place of the battery 20 providing the reference voltage of FIG. 1, there is utilized in FIG. 2 a precisely regulated direct current source of supply 32 which includes the load resistor 19 in its output circuit. This source may be of the type shown in "Selected Semiconductor Circuits Handbook," edited by S. Schwartz (1960), page 8–42. Though the source 32 may also be utilized for producing the bias to maintain transistor 17 non-conductive, a second direct current source of supply 33 which need not be closely regulated may be utilized. This source of supply 33 produces a flow of current through a series resistor 34 and a diode 35 of the semi-conductor type. The potential difference across the diode 35 is in a direction for application of a bias through resistor 36 to the transistor 17 to maintain it non-conductive. Thus the type of diode 35 and the magnitude of resistor 36 will be selected in terms of the characteristics of the transistor 17 of the NPN type.

The operation of the system of FIG. 2 is identical with the operation of FIG. 1 and that description need not be repeated. The input applied to the input terminals 41 and 42 of the direct current amplifier 30 may be derived from any suitable means, such for example as a potentiometer of the slidewire type, in which the position of the movable contact of the slidewire varies the input voltage in response to change in the magnitude of a measured variable. The latter may be voltage, current, frequency, power, or a process characteristic which for purposes of telemetering, or otherwise, is to be transformed into an output signal, as at terminals 11 and 12, whose frequency is proportional to the magnitude of the input voltage as applied at terminals 41 and 42.

In many applications it will be desirable to utilize a flip-flop or multivibrator circuit 45 of conventional type which upon application to its input circuit of the negative pulses, will generate at its output terminals 46 and 47 square waves of equal positive and negative duration and with a frequency one half of the frequency of the input pulses as developed at output terminal 11. In utilizing a flip-flop or multivibrator of the type illustrated in FIG. 4–12(*d*) "Digital Computer Components and Circuits," by R. K. Richards (1957), a first pulse at terminal 11 produces a first half of the square wave output and the second pulse produces the second half of the square wave output. Accordingly, the frequency of the square wave output at terminals 46 and 47 will be half that of the frequency of the pulses at terminal 11. By utilizing a second multivibrator the frequency may again be halved, a feature useful in some applications.

Though those skilled in the art will understand, in view of the description thus far set forth, how to select suitable values for the several circuit components, it may nevertheless be helpful to state that the normal pulse repetition rate is dependent not only upon the value of the input voltage 13 but also upon the magnitude of the reference voltage 20, FIG. 1 (the voltage of the source of supply 32 of FIG. 2), the value of the resistor 31 and the size of the capacitor 21. For the range of frequency of from 36 cycles per second to 60 cycles per second at output terminal 11, the reference voltage 20 had a value of 6.2 volts as applied to the load resistor 19 of 10,000 ohms, the capacitor 21 of 0.039 microfarad and the output characteristic resistance of the source 15 (or resistance means 31 of FIG. 2) of the order of 2 megohms. For all practical purposes, the period between regenerative cycles, between successive discharges of the capacitor, will be inversely proportional to the magnitude of the input voltage $E_{in}$ and the pulse repetition rate will be proportional to the voltage over the indicated frequency range of from about 36 cycles per second to about 60 cycles per second.

The input voltage 13 when applied as in FIG. 2 will range from about 20 volts D.C. for a pulse repetition rate of 36 cycles per second to about 30 volts for a pulse repetition rate of 60 cycles per second, the end result in FIG. 2 being a square wave output at terminal 46 of 18 cycles per second to 30 cycles per second.

The PNP transistor 16 may be of the 2N1024 type and the NPN transistor 17 may be of the Transitron ST–29 type.

As indicated above, the present invention is not limited to the temperature compensating circuit of the kind illustrated in FIG. 2 since other temperature compensating circuits known to those skilled in the art may be utilized. Additionally, certain features discussed in conjunction with the modification of FIG. 1 may be utilized in FIG. 2 or vice versa and further changes may be made, all within the scope of the appended claims.

What is claimed is:

1. An oscillator having an output frequency proportional to the magnitude of an applied direct current input, comprising a pair of transistors of opposite type, a direct connection between the collector of the second of said transistors to the base of a first of said transistors forming a regenerative feedback connection, a direct connection between the collector of said first transistor to the base of said second transistor for controlling the conductivity of the latter by the output of the former, biasing means for normally maintaining non-conductive said second transistor, an input circuit for said first transistor including in series a variable direct current source of supply, the emitter-base junction of said first transistor, a load resistor and a source of reference voltage of polarity to bias said first transistor to its non-conductive state, a capacitor connected across said direct current source of supply for receiving a charge therefrom to change the potential applied to said emitter-base junction to render said first transistor conductive when the potential of said capacitor rises to a value at least equal to said reference voltage for flow of current to the base of said second transistor for rendering it conductive, said regenerative feedback connection thereupon producing operation of said transistors in their fully conductive current saturated states for discharge of said capacitor through a circuit including only the low internal resistances of said current saturated transistors, the current flowing from said capacitor rapidly decreasing to a value which results in a rise in potential at the collector of said second transistor thereby causing a rise of potential on the base-emitter junction of said first transistor to render it non-conductive until the potential of said capacitor again rises to a value at least equal to said reference voltage, and means including a connection to the collector of said second transistor for deriving output pulses at said output at a frequency proportional to the magnitude of said direct current input.

2. The oscillator of claim 1 in which said variable direct current source of supply includes means for developing an output current whose magnitude is to a close approximation linearly proportional to the magnitude of a constant input.

3. The oscillator of claim 1 in which said variable direct current source of supply comprises the output of a direct current amplifier in series with an input resistor of relatively high value to provide a current which to a close approximation is constant through a predetermined range.

4. The oscillator of claim 3 in which said input resistor has at least a portion thereof having a temperature coefficient of resistance to compensate for the tendency of the leakage current of said transistor to rise with rise in ambient temperature.

5. The oscillator of claim 1 in which said biasing means for normally maintaining non-conductive said second transistor comprises a diode of the semi-conductor type connected to said emitter, a resistor completing the connection from said diode to the base of said second transistor, and a source of direct current for producing flow of current through said diode for development of said biasing potential.

6. The oscillator of claim 1 in which said means including said connection to the collector of said second transistor comprises one side of an output circuit the other side of which is connected to the emitter of said second transistor, said output circuit having its respective sides connected across the series-connected combination of said source of reference voltage and said load resistor.

References Cited in the file of this patent

UNITED STATES PATENTS 2,788,449 Bright ---------------- Apr. 9, 1957